(12) United States Patent
Yoshizawa

(10) Patent No.: US 12,494,124 B2
(45) Date of Patent: Dec. 9, 2025

(54) FALL DAMAGE REDUCING SYSTEM, FLYING DEVICE, AND VEHICLE-MOUNTED DEVICE

(71) Applicant: DENSO CORPORATION, Kariya (JP)

(72) Inventor: Shin Yoshizawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 333 days.

(21) Appl. No.: 18/165,505

(22) Filed: Feb. 7, 2023

(65) Prior Publication Data

US 2023/0186768 A1 Jun. 15, 2023

Related U.S. Application Data

(63) Continuation of application No. PCT/JP2021/029886, filed on Aug. 16, 2021.

(30) Foreign Application Priority Data

Sep. 3, 2020 (JP) ................. 2020-148191

(51) Int. Cl.
*G08G 1/16* (2006.01)
*B64C 39/02* (2023.01)
(Continued)

(52) U.S. Cl.
CPC ............. *G08G 1/162* (2013.01); *B64C 39/02* (2013.01); *G08G 1/096725* (2013.01);
(Continued)

(58) Field of Classification Search
CPC ............. G08G 1/162; G08G 1/096725; G08G 1/096791; G08G 1/166; G08G 1/0141;
(Continued)

(56) References Cited

U.S. PATENT DOCUMENTS 11,062,582 B1 * 7/2021 Van Wiemeersch ... G08B 29/24
2013/0279392 A1 * 10/2013 Rubin ..................... H04W 4/12
370/312
(Continued)

FOREIGN PATENT DOCUMENTS

JP 2017043161 A 3/2017
JP 2017210156 A 11/2017
(Continued)

*Primary Examiner* — Brian P Sweeney
*Assistant Examiner* — Alexander George Matta
(74) *Attorney, Agent, or Firm* — Harness, Dickey & Pierce, P.L.C.

(57) ABSTRACT

A fall damage reducing system includes a flying device and a vehicle-mounted device. The flying device: performs a wireless communication under a vehicle to vehicle communication standard; determines a falling possibility of the flying device; and transmits falling information indicating an estimated falling position of the flying device in response to the falling possibility being determined. The vehicle-mounted device: performs a wireless communication under the vehicle to vehicle communication standard; executes a vehicle control on a subject vehicle to avoid the estimated falling position in response to the falling information being received; and transmits traveling information indicating the vehicle control executed on the subject vehicle. In response to the traveling information from a different vehicle being received, the vehicle-mounted device executes a collision avoidance process to avoid a collision with the different vehicle.

8 Claims, 4 Drawing Sheets

(51) Int. Cl.
  *G08G 1/0967* (2006.01)
  *H04W 4/46* (2018.01)
  *H04W 4/90* (2018.01)
(52) U.S. Cl.
  CPC ........ *G08G 1/096791* (2013.01); *G08G 1/166* (2013.01); *H04W 4/46* (2018.02); *H04W 4/90* (2018.02)
(58) Field of Classification Search
  CPC ...... G08G 1/0965; G08G 1/207; G08G 1/205; G08G 5/80; B64C 39/02; H04W 4/46; H04W 4/90; B64D 25/00; G08B 21/00; G08B 21/24
  See application file for complete search history.

(56) References Cited

U.S. PATENT DOCUMENTS

| | | |
|---|---|---|
| 2016/0373449 A1 | 12/2016 | Haga et al. |
| 2017/0355469 A1* | 12/2017 | Canning ................ B64D 45/00 |
| 2019/0263336 A1 | 8/2019 | Haga et al. |
| 2019/0272760 A1* | 9/2019 | Mcquillen ................ G08G 1/22 |
| 2019/0325750 A1* | 10/2019 | Bielby ................ G08G 1/0133 |
| 2019/0344679 A1 | 11/2019 | Miller et al. |
| 2020/0057454 A1 | 2/2020 | Ichihara |
| 2020/0331607 A1 | 10/2020 | Yamada et al. |
| 2020/0410878 A1* | 12/2020 | Tachiiwa ......... G08G 1/096775 |
| 2021/0090442 A1 | 3/2021 | Haga et al. |
| 2022/0366802 A1* | 11/2022 | Sato ........................ G08G 5/22 |
| 2022/0398932 A1* | 12/2022 | Ahmad ................. H04W 4/90 |

FOREIGN PATENT DOCUMENTS

| | | |
|---|---|---|
| JP | 2017-224146 A | 12/2017 |
| JP | 2019159811 A | 9/2019 |
| JP | 2020013607 A | 1/2020 |
| JP | 2020123159 A | 8/2020 |
| WO | WO-2019146579 A1 | 8/2019 |

* cited by examiner

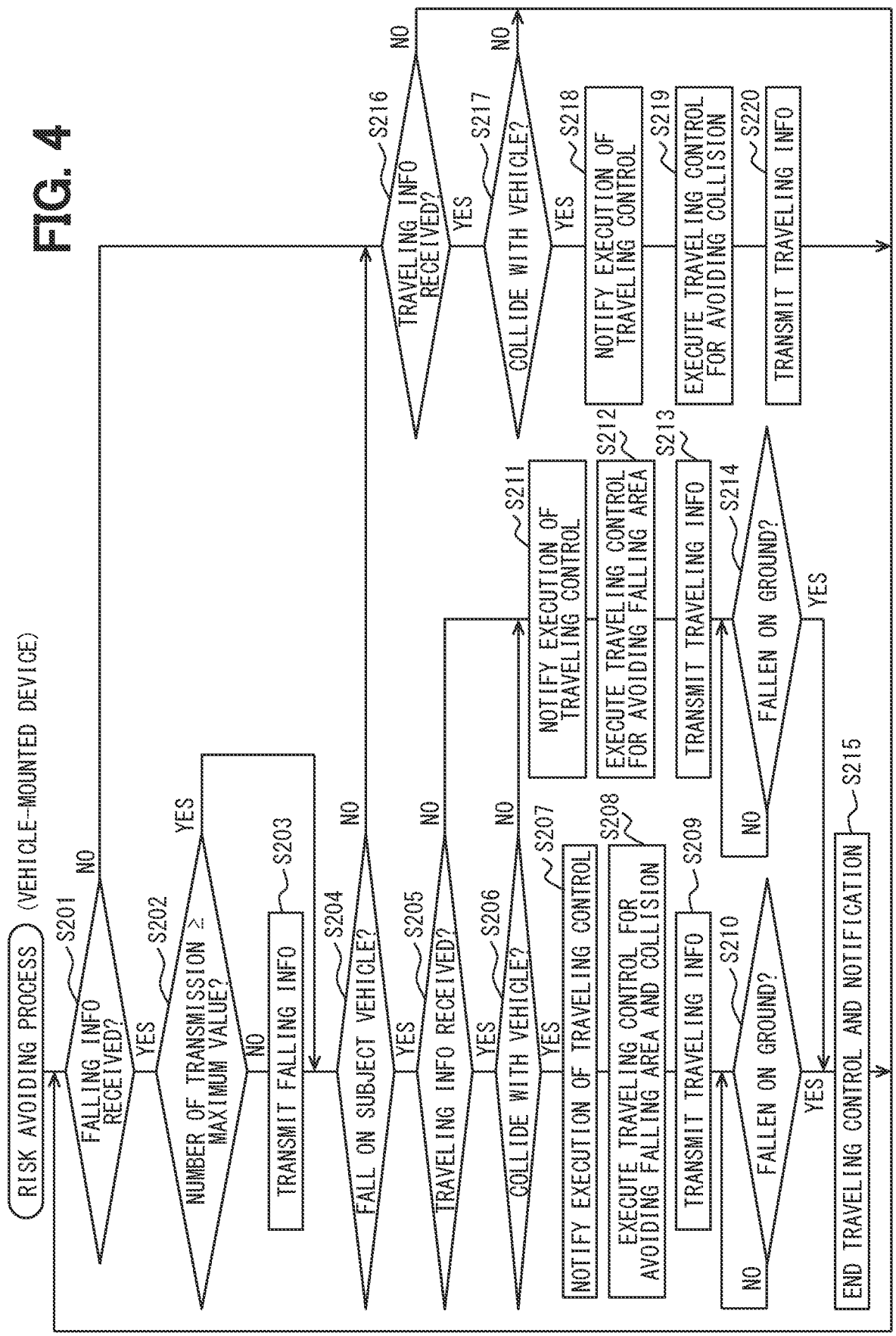

FALL DAMAGE REDUCING SYSTEM, FLYING DEVICE, AND VEHICLE-MOUNTED DEVICE

CROSS REFERENCE TO RELATED APPLICATIONS

The present application is a continuation application of International Patent Application No. PCT/JP2021/029886 filed on Aug. 16, 2021, which designated the U.S. and claims the benefit of priority from Japanese Patent Application No. 2020-148191 filed on Sep. 3, 2020. The entire disclosures of all of the above applications are incorporated herein by reference.

TECHNICAL FIELD

The present disclosure relates to a technology for reducing fall damage caused by falling of a flying device.

BACKGROUND

Conventionally, a technology for reducing a damage on vehicles caused by falling of flying device is well known.

SUMMARY

A fall damage reducing system includes a flying device and a vehicle-mounted device. The flying device: performs a wireless communication under a vehicle to vehicle communication standard; determines a falling possibility of the flying device; and transmits falling information indicating an estimated falling position of the flying device in response to the falling possibility being determined. The vehicle-mounted device: performs a wireless communication under the vehicle to vehicle communication standard; executes a vehicle control on a subject vehicle to avoid the estimated falling position in response to the falling information being received; and transmits traveling information indicating the vehicle control executed on the subject vehicle. In response to the traveling information from a different vehicle being received, the vehicle-mounted device executes a collision avoidance process to avoid a collision with the different vehicle.

BRIEF DESCRIPTION OF DRAWINGS

Objects, features and advantages of the present disclosure will become apparent from the following detailed description made with reference to the accompanying drawings. In the drawings:

FIG. 4 is a flowchart showing a risk avoiding process performed by a vehicle-mounted device.

DETAILED DESCRIPTION

Figure 1:
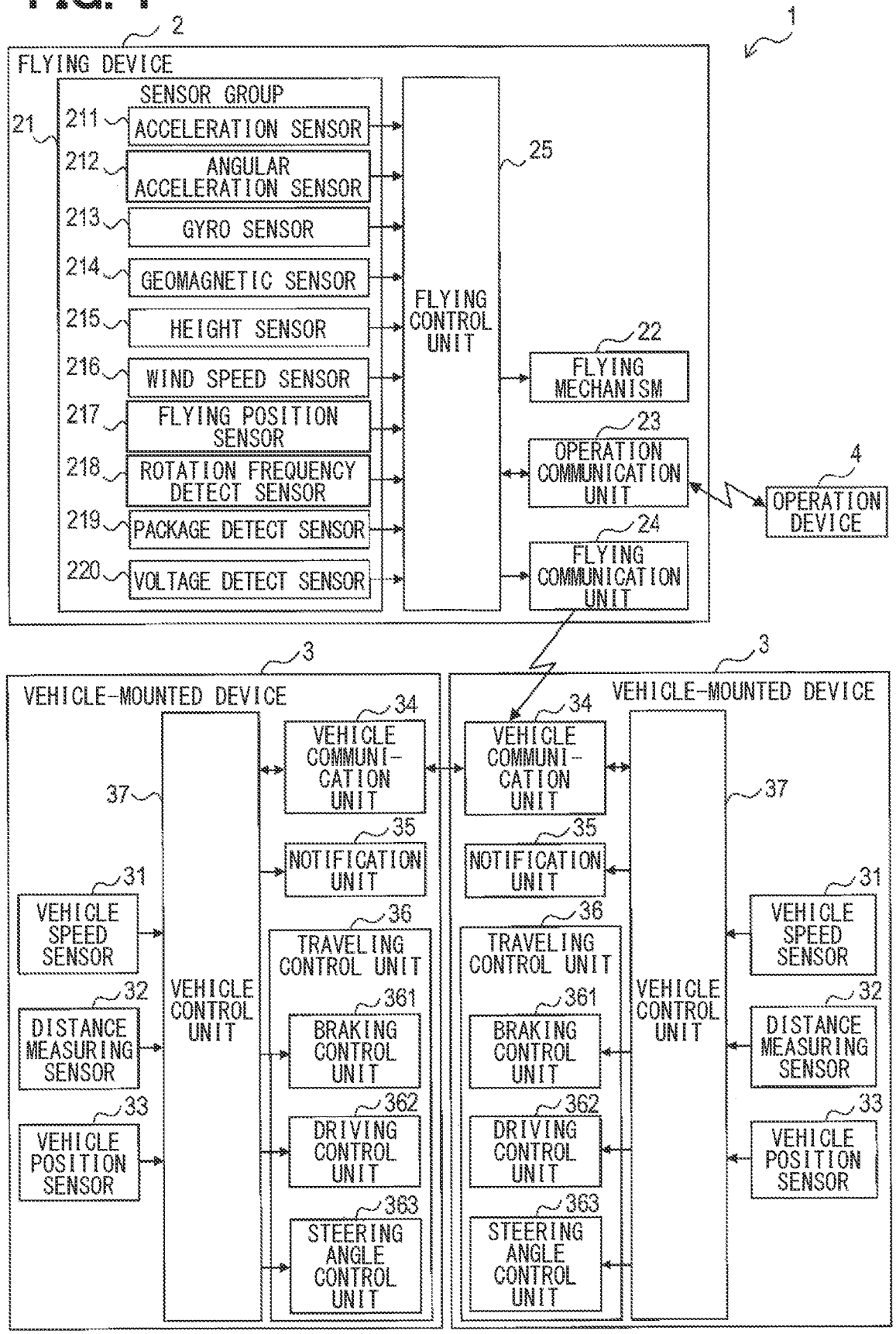
FIG. 1 is a block diagram indicating a configuration of a fall damage reducing system.

In a technology for reducing a damage on vehicles caused by falling of flying device, when a falling possibility of the flying device is specified, the flying device transmits notification information indicating the falling possibility to a flying management device, which is a device managing the flying device. When the notification information from the flying device is received, the flying management device estimates an attention area, and transmits warning information to a roadside information providing device. The attention area is an area where the flying device is possible to fall. The warning information transmitted to the roadside information providing device is notified to the vehicles traveling in the attention area by the road information providing device. A road management utility uses the road information providing device as a server for road management purpose. The road information providing device transmits the warning information to the vehicles using a road information transmitting device equipped to a roadside.

In the above-described configuration, the falling possibility of the flying device cannot be notified to a vehicle traveling on a road which is not equipped with the road information transmitting device.

Thus, it is conceivable that direct notification may be performed to the vehicle of the falling possibility of the flying device by directly transmitting the notification to the vehicle. It can be implemented by equipping, to each vehicle, a receiver for directly receiving information transmitted from the flying device. However, as a result of detailed study by the inventor of the present disclosure, since frequent falling of the flying device is not assumed, the receiver for directly receiving falling information from the flying device is unlikely to be widely used.

Although the direct notification of the falling possibility from the flying device to the vehicle is conceivable, details for implementing the direct notification is not disclosed in the conventional art.

One embodiment of the present disclosure provides a technique with improved effectiveness for reducing the fall damage caused by falling of the flying device.

According to an embodiment of the present disclosure, a fall damage reducing system includes a flying device and a vehicle-mounted device. The flying device includes: a flying communication unit performing a wireless communication under a vehicle to vehicle communication standard; a device falling determination unit determining a falling possibility of the flying device; and a flying notification unit transmitting, via the flying communication unit, falling information including information indicating an estimated falling position of the flying device in response to the device falling determination unit determining the falling possibility of the flying device. The vehicle-mounted device includes: a vehicle communication unit performing a wireless communication under the vehicle to vehicle communication standard; a processing unit executing a falling avoidance process on a subject vehicle to avoid the estimated falling position when the vehicle communication unit receives the falling information, the processing unit executing a vehicle control on the subject vehicle to avoid the estimated falling position as the falling avoidance process; and a traveling notification unit executing a notification process by transmitting, via the vehicle communication unit, traveling information indicating the vehicle control executed on the subject vehicle. When the vehicle communication unit receives traveling information from a different vehicle, the processing unit executes a collision avoidance process to avoid a collision with the different vehicle from which the traveling information is transmitted. With such configuration, the effectiveness of reducing the fall damage of the flying device on the vehicle can be improved.

According to another embodiment of the present disclosure, a vehicle-mounted device is provided. The vehicle-mounted device is included in a fall damage reducing system, and the fall damage reducing system further includes a flying device that transmits falling information indicating an estimated falling position of the flying device under a vehicle to vehicle communication standard in response to a falling possibility of the flying device being determined. The vehicle-mounted device includes: a vehicle communication unit performing a wireless communication under the vehicle to vehicle communication standard; a processing unit executing a falling avoidance process on a subject vehicle to avoid the estimated falling position when the vehicle communication unit receives the falling information, the processing unit executing a vehicle control on the subject vehicle to avoid the estimated falling position as the falling avoidance process; and a traveling notification unit executing a notification process by transmitting, via the vehicle communication unit, traveling information indicating the vehicle control executed on the subject vehicle. When the vehicle communication unit receives traveling information from a different vehicle, the processing unit executes a collision avoidance process to avoid a collision with the different vehicle from which the traveling information is transmitted. With such configuration, the effectiveness of reducing the fall damage of the flying device on the vehicle can be improved.

Exemplary embodiments of the present disclosure will be described below with reference to the accompanying drawings.

1. Overall Configuration

As shown in FIG. 1, a fall damage reducing system includes a flying device 2 and multiple vehicle-mounted devices 3. The fall damage reducing system 1 notifies a vehicle traveling on ground of a falling possibility of the flying device 2 when the flying device 2 is determined to have the falling possibility.

2. Configuration of Flying Device

The flying device 2 is a compact type flying device capable of unmanned flying by remote operation through wireless communication. The flying device 2 is able to fly while carrying packages. Thus, the flying device can be used for delivering packages.

The flying device 2 includes a sensor group 21, a flying mechanism 22, an operation communication unit 23, a flying communication unit 24, and a flying control unit 25.

The sensor group 21 includes various types of sensors for detecting flying condition of the flying device 2. In the present embodiment, the sensor group 21 includes an acceleration sensor 211, an angular acceleration sensor 212, a gyro sensor 213, a geomagnetic sensor 214, a height sensor 215, a wind speed sensor 216, a flying position sensor 217, a rotation frequency detecting sensor 218, a package detecting sensor 219, and a voltage detecting sensor 220.

The acceleration sensor 211 detects an acceleration applied to the flying device 2 in each axial direction of three-dimension, and outputs acceleration information indicating detection result to the flying control unit 25. The axial directions of three-dimension include X axis direction, Y axis direction, and Z axis direction.

The angular acceleration sensor 212 detects an angular acceleration applied to the flying device 2 in each axial direction of three-dimension, and outputs angular acceleration information indicating detection result to the flying control unit 25.

The gyro sensor 213 detects an angular speed in each axial direction of three-dimension, and outputs angular speed information indicating detection result to the flying control unit 25.

The geomagnetic sensor 214 detects terrestrial geomagnetism in each axial direction of three-dimension, and outputs terrestrial geomagnetic information indicating detection result to the flying control unit 25.

The height sensor 215 detects a height based on, for example, atmospheric pressure, and outputs height information indicating detection result to the flying control unit 25.

The wind speed sensor 216 detects strength and direction of wind around the flying device 2, and outputs wind speed information indicating detection result to the flying control unit 25.

The flying position sensor 217 receives GPS signal from GPS satellites, and outputs the received GPS signal to the flying control unit 25. GPS is an abbreviation of global positioning system.

The rotation frequency detecting sensor 218 detects rotation frequency of a motor, and outputs rotation frequency information indicating detection result to the flying control unit 25. As the rotation frequency detecting sensor 218, for example, a magnetic sensor or an optical rotation frequency measuring device may be used.

The package detecting sensor 219 detects whether the flying device 2 carries a package, and outputs package information indicating detection result to the flying control unit 25. As the package detecting sensor 219, for example, an infrared sensor or a weight sensor may be used.

The voltage detecting sensor 220 detects a voltage output from a battery (not shown in figures) for driving the flying device 2, and outputs voltage information indicating detection result to the flying control unit 25.

The flying mechanism 22 includes the motor, a propeller, a servo motor, and the like as, which are not shown in details in the figures. The motor corresponds to a driving source for rotating the propeller. The propeller is driven to rotate by the motor. The servo motor changes a pitch of the propeller. The flying mechanism 22 generates a propellant force by driving the propeller to rotate using the motor and changing the pitch of propeller using the servo motor. The flying device 2 flies by the propellant force generated by the flying mechanism 22.

The operation communication unit 23 is configured to wirelessly communicate with an operation device 4, which is separately configured from the flying device 2. The operation device 4 performs wireless communication with the flying device 2. The operation device 4 is configured to be operable by an operator of the flying device 2, and transmits instructions input by the operator to the flying device via wireless communication.

The flying communication unit 24 is configured to perform wireless communication compliant with a standard of vehicle to vehicle communication.

The flying control unit 25 is mainly configured by a well-known microcomputer. The microcomputer may include a CPU, a ROM, a RAM, which are not shown in figures. The CPU executes a program stored in a ROM. The ROM is a non-transitory tangible storage medium. When the program stored in the ROM is executed, a method corresponding to the program is executed. The flying control unit 25 may include one or more microcomputers. The functions of the flying control unit 25 may be implemented in software manner or hardware manner. For example, partial or all of the functions of the flying control unit 25 may be implemented by one or more hardware circuits. When the above functions are implemented by an electronic circuit in hardware manner, the electronic circuit may include one or more digital circuits, one or more analog circuits, or combination of one or more digital circuits and one or more analog circuits.

The flying control unit 25 detects a flying state of the flying device 2 based on input information from the sensor group 21. Specifically, the flying state includes a flying posture, a flying speed, a flying direction, a flying height, and a flying position, which are detected based on the acceleration information, the angular acceleration information, angular speed information, the terrestrial geomagnetic information, the height information, the wind speed information, and the GPS signal. The flying control unit 25 controls the propellant force of the flying mechanism 22 based on the flying state and the instructions from the operation device 4.

The flying control unit 25 determines the falling possibility of the flying device 2. The flying control unit 25 further determines a falling possibility of the package carried by the flying device 2, and determine a falling possibility of a part of the flying device 2. When the flying control unit 25 determines the falling possibility of the flying device 2, the falling possibility of the package carried by the flying device 2, or the falling possibility of a part of the flying device 2, the flying control unit 25 calculates, as the falling information, an estimated falling area and an estimated falling time. Then, the flying control unit 25 transmits the falling information via the flying communication unit 24. The falling area is an estimated area where the flying device 2, a part of the flying device 2, or the package carried by the flying device 2 actually falls on the ground with high possibility after the falling possibility is determined. The falling time is an estimated time when the flying device 2, a part of the flying device 2, or the package carried by the flying device 2 actually falls on the ground after the falling possibility is determined.

3. Configuration of the Vehicle-Mounted Device

The vehicle-mounted device 3 is equipped to each vehicle. In the present embodiment, each vehicle has at least an automatic braking function. The vehicle with automatic braking function may include a vehicle with driving assistance function and a vehicle with autonomous driving function. The vehicle with driving assistance function can maintain a certain inter-vehicle distance in a traveling state, and can control the vehicle to decelerate to avoid a collision with an obstacle.

The vehicle-mounted device 3 includes a vehicle speed sensor 31, a distance measuring sensor 32, a vehicle position sensor 33, a vehicle communication unit 34, a notification unit 35, a traveling control unit 36, and a vehicle control unit 37.

The vehicle speed sensor 31 detects a traveling speed of a subject vehicle and outputs vehicle speed information indicating the detected result to the vehicle control unit 37. The subject vehicle is a vehicle to which vehicle related sensors, such as the vehicle speed sensor is attached.

The distance measuring sensor 32 detects a distance between the subject vehicle and a surrounding object, and also detects a relative speed of the subject vehicle relative to the surrounding object. The distance measuring sensor 32 outputs distance measuring information indicating the detected result to the vehicle control unit 37. The distance measuring sensor 32 may be provided by, for example, a millimeter wave radar.

The vehicle position sensor 33 receives the GPS signal from the GPS satellites, and outputs the received GPS signal to the vehicle control unit 37.

The vehicle communication unit 34 performs wireless communication compliant to the vehicle to vehicle communication standard.

The notification unit 35 performs a notification to the driver, for example, by outputting an audio signal or displaying an image.

The traveling control unit 36 controls a traveling of the subject vehicle by using various mechanisms of the subject vehicle. The traveling control unit 36 includes a driving control unit 361, a braking control unit 362, and a steering angle control unit 363. The driving control unit 361 controls a driving unit, which is not shown in figures. The driving unit drives wheels of the subject vehicle. The driving unit may be an internal-combustion engine, an electric motor, or the like. The braking control unit 362 controls the brake of the subject vehicle. The steering angle control unit 363 controls a steering angle of a steering wheel of the subject vehicle.

The vehicle control unit 37 is mainly configured by a well-known microcomputer. The microcomputer may include a CPU, a ROM, a RAM, which are not shown in figures. The CPU executes a program stored in a ROM. The ROM is a non-transitory tangible storage medium. When the program stored in the ROM is executed, a method corresponding to the program is executed. The vehicle control unit 37 may include one or more microcomputers. The functions of the vehicle control unit 37 may be implemented in software manner or hardware manner. For example, partial or all of the functions of the vehicle control unit 37 may be implemented by one or more hardware circuits. When the above functions are implemented by an electronic circuit in hardware manner, the electronic circuit may include one or more digital circuits, one or more analog circuits, or combination of one or more digital circuits and one or more analog circuits. The vehicle control unit 37 performs traveling control based on information received via the vehicle communication unit 34. The vehicle control unit 37 transmits the information via the vehicle communication unit 34. In the present embodiment, the vehicle control unit 37 transmits the received falling information and traveling information related to the executed traveling control of the vehicle.

4. Overview of Process

Figure 2:
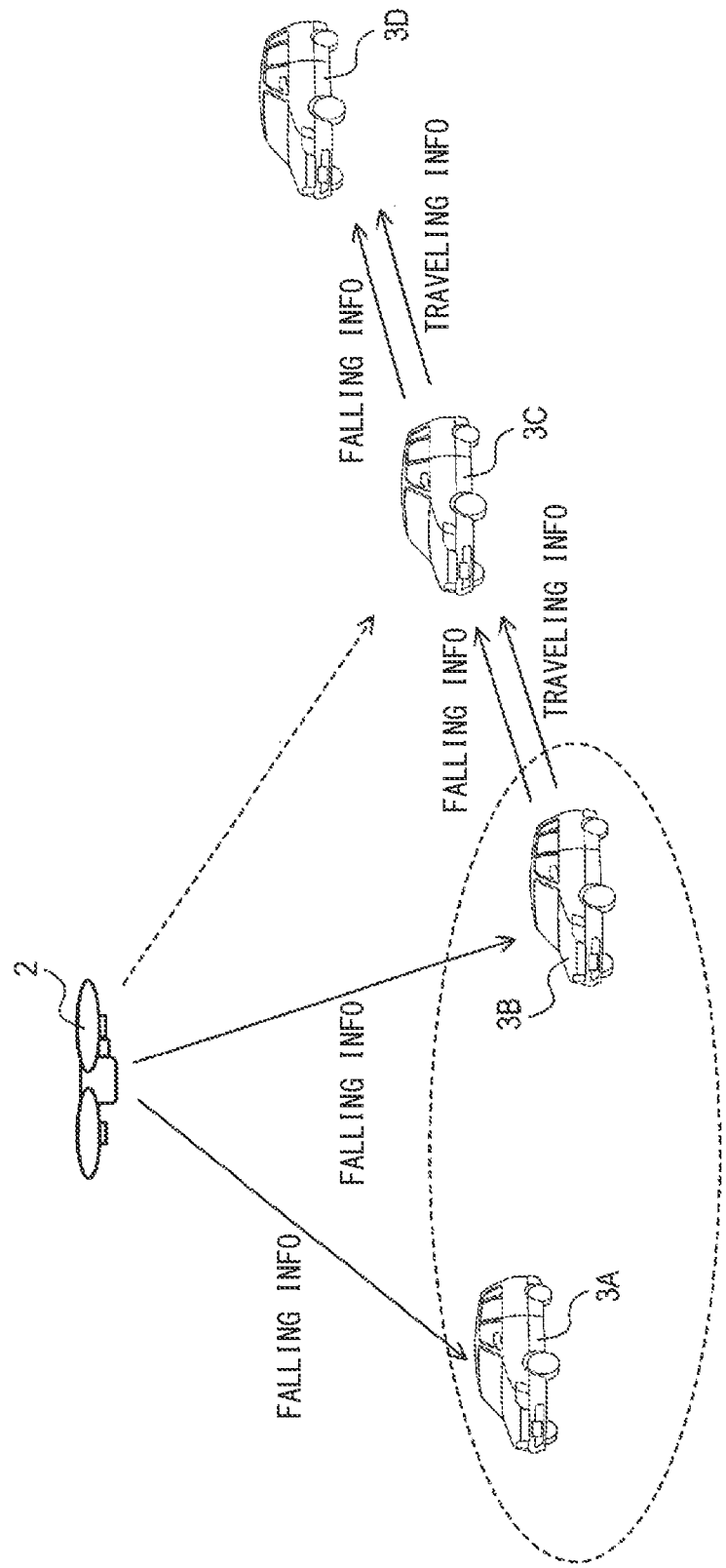
FIG. 2 is a schematic view of the fall damage reducing system.

The following will describe overview of the process performed by the fall damage reducing system 1 with reference of FIG. 2.

In FIG. 2, the vehicles 3A to 3D each is equipped with the vehicle-mounted device 3. The vehicle 3A and the vehicle 3B are positioned within a communication area of the flying device 2. The communication area of the flying device 2 is an area able to receive information transmitted from the flying device 2 via wireless communication compliant to vehicle to vehicle communication standard. The vehicle-mounted device 3 equipped to each of the vehicle 3A and the vehicle 3B is able to receive the information transmitted from the flying device 2. Hereinafter, the vehicle within the communication area of the flying device 2 is referred to as a warning target vehicle.

The vehicle 3C and the vehicle 3D are positioned out of the communication area of the flying device 2. That is, the vehicle 3C and the vehicle 3D do not receive the information transmitted from the flying device 2. Hereinafter, the vehicle existing out of the communication area of the flying device 2 is referred to as a non-warning target vehicle.

The vehicle 3C, which is the non-warning target vehicle, is positioned within a communication area of vehicle-mounted device 3 equipped to the vehicle 3B, which is the warning target vehicle. The communication area of vehicle-mounted device 3 is an area ale to receive information transmitted from the vehicle-mounted device 3 via wireless communication compliant to the vehicle to vehicle communication standard. That is, the vehicle-mounted device 3 equipped to the vehicle 3C, which is the non-warning target vehicle, is able to receive the information transmitted from the vehicle-mounted device 3 equipped to the vehicle 3B, which is the warning target vehicle.

The vehicle 3D, which is the non-warning target vehicle, is positioned within the communication area of the vehicle-mounted device 3 equipped to the vehicle 3C, which is the non-warning target vehicle. That is, the vehicle-mounted device 3 equipped to the vehicle 3D, which is the non-warning target vehicle, is able to receive the information transmitted from the vehicle-mounted device 3 equipped to the vehicle 3C, which is the non-warning target vehicle.

The vehicle to vehicle communication standard in the present embodiment may be a known standard used for vehicle to vehicle communication, as one of V2X communication technologies. The communication performed by the vehicle-mounted device based on the vehicle to vehicle communication standard is a known technology. Here, V2X is an abbreviation of vehicle to X. Hereinafter, the wireless communication performed by the vehicle-mounted device 3 based on the vehicle to vehicle communication standard is simply referred to as vehicle to vehicle communication.

The flying device 2 transmits the falling information when the falling possibility of the flying device 2 is determined, that is, when it is determined that the flying device 2 is possible to fall. In response to receiving of the falling information from the flying device 2, the vehicle-mounted device 3 equipped to the warning target vehicle transmits the received falling information via vehicle to vehicle communication. Thus, the non-warning target vehicle can be notified of the falling possibility of the flying device 2. For example, the vehicle-mounted device 3 equipped to each warning target vehicle 3A, 3B transmits the received falling information via the vehicle to vehicle communication when the falling information is received from the flying device 2. With this configuration, the non-warning target vehicle 3C can also be notified of the falling possibility of the flying device 2.

When the vehicle-mounted device 3 receives the falling information from another vehicle-mounted device 3, the vehicle-mounted device 3 transmits the received falling information via the vehicle to vehicle communication. With this configuration, the falling information can be spread in chain by further transmission of the received falling information. Thus, all of vehicles traveling in the falling area can be notified of the falling possibility of the flying device 2. For example, when the vehicle-mounted device 3 equipped to the non-warning target vehicle 3C receives the falling information via vehicle to vehicle communication from the vehicle-mounted device 3 equipped to the warning target vehicle 3B, the vehicle-mounted device 3 equipped to the non-warning target vehicle 3C further transmits the received falling information via vehicle to vehicle communication. Similarly, when the vehicle-mounted device 3 equipped to the non-warning target vehicle 3D receives the falling information via vehicle to vehicle communication from the vehicle-mounted device 3 equipped to the non-warning target vehicle 3C, the vehicle-mounted device 3 equipped to the non-warning target vehicle 3D further transmits the received falling information via vehicle to vehicle communication.

The vehicle-mounted device 3 performs traveling control for avoiding the falling area based on the received falling information, and transmits the traveling information via vehicle to vehicle communication. When another vehicle-mounted device receives the traveling information, another vehicle-mounted device 3 performs a traveling control for avoiding a collision with the vehicle from which the traveling information is transmitted. This configuration can avoid a secondary damage, which is caused by a collision between a transmission source vehicle performing the traveling control and another vehicle traveling in periphery area of the transmission source vehicle. For example, based on the falling information received from the flying device 2, the vehicle-mounted device 3 equipped to the warning target vehicle 3B performs the traveling control for avoiding the falling area, and transmits the traveling information via vehicle to vehicle communication. The vehicle-mounted device 3 equipped to the non-warning target vehicle 3C receives the traveling information from the vehicle-mounted device 3 equipped to the warning target vehicle 3B. The vehicle-mounted device 3 equipped to the non-warning target vehicle 3C performs the traveling control for avoiding a collision with the vehicle 3B from which the traveling information is transmitted, and transmits the traveling information via vehicle to vehicle communication. Here, the traveling information transmitted from the vehicle-mounted device 3 equipped to the non-warning target vehicle 3C is the traveling information related to the traveling control performed on the vehicle 3C, but not the traveling information received from the warning target vehicle 3B. Similarly, the vehicle-mounted device 3 equipped to the non-warning target vehicle 3D receives the falling information from the vehicle-mounted device 3 equipped to the non-warning target vehicle 3C, and performs the traveling control for avoiding a collision with the vehicle 3C, from which the traveling information is transmitted, and transmits own traveling information related to the performed traveling control on own vehicle via vehicle to vehicle communication.

5. Process Executed by Flying Device

Figure 3:
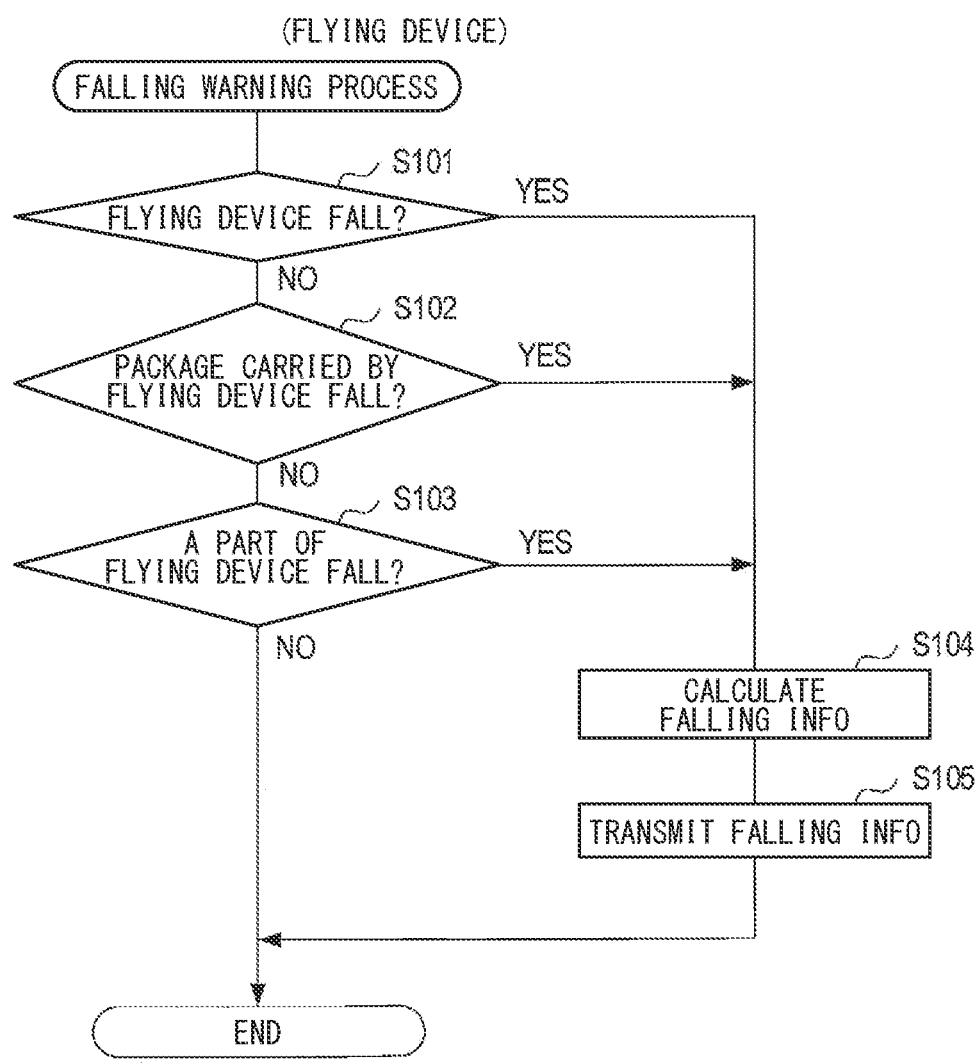
FIG. 3 is a flowchart showing a falling warning process performed by a flying device.

The following will describe a falling warning process executed by the flying control unit 25 of the flying device 2 with reference to the flowchart of FIG. 3. The flying control unit 25 executes the falling warning process shown in FIG. 3 at a predetermined cycle.

In S101, the flying control unit 25 determines the falling possibility of the flying device 2. In the present embodiment, the flying control unit 25 determines the falling possibility of the flying device 2 based on the input information from the sensor group 21. For example, the flying control unit 25 determines the flying device 2 is possible to fall when (i) an actual remaining battery capacity calculated based on the voltage information is less than a required remaining battery capacity for reaching a possible landing location, or (ii) a detected result indicated by the voltage information is abnormal. For example, the flying control unit 25 determines the flying device 2 is possible to fall when change of the flying posture detected based on the angular speed information or the like is out of an allowable range. For example, the flying control unit 25 determines the flying device 2 is possible to fall when the detection result indicating wind speed information is out of an allowable range, for example when the wind speed is fast and wind direction is upward. When the flying device 2 is determined as not possible to fall in S101, the process proceeds to S102.

In S102, the flying control unit 25 determines the falling possibility of the package carried by the flying device 2. In the present embodiment, the flying control unit 25 determines the falling possibility of the package carried by the flying device 2 based on the package information. For example, the flying control unit 25 determines the falling possibility of the package carried by the flying device 2 when the package carried by the flying device 2 is not detected during flying of the flying device 2. When the falling possibility of the package carried by the flying device 2 is determined in S102, the process proceeds to S103.

In S103, the flying control unit 25 determine the falling possibility of a part of the flying device 2. Herein, a part of the flying device 2 is a part that does not hinder the flying of the flying device 2 even when the part falls from the flying device and then becomes lost, for example, a part of housing end (not shown in figures) for accommodating the flying control unit 25 and the like. For example, when a change in the flying posture, which is caused by loss of the part of the flying device 2, is detected based on the angular speed information, the flying control unit 25 determines the falling possibility of a part of the flying device 2. The flying control unit 25 detects a change in the center of gravity based on the change in the flying posture, which is caused by the loss of a part of the flying device 2. For example, when the flying device 2 is a multi-copter flying device with at least two propellers, the flying control unit 25 may detect necessary information for maintaining the flying posture of the flying device 2. The necessary information for maintaining the flying posture of the flying device 2 may include a change in gravity center position of the flying device 2 based on changes in propeller rotation rate or propeller pitch rate among multiple propellers. In S103, when a part of the flying device 2 is determined as not possible to fall, the flying control unit 25 ends the falling warning process shown in FIG. 3.

When the flying control unit 25 determines that the flying device 2 is possible to fall in S101, the process proceeds to S104. When the flying control unit 25 determines that the package carried by the flying device 2 is possible to fall in S102, the process proceeds to S104. When the flying control unit 25 determines that a part of the flying device 2 is possible to fall in S103, the process proceeds to S104.

In S104, the flying control unit 25 calculates the falling information. In the present embodiment, the flying control unit 25 calculates, as the falling information, estimated falling area and estimated falling time. Specifically, the flying control unit 25 calculates the estimated falling area and the estimated falling time based on the flying speed, flying direction, flying height, and flying position of the flying device 2. For example, when the flying device 2 starts to fall from a current time and a current flying state, the flying control unit 25 calculates a point and a time corresponding to a flying height of zero as a falling point and a falling time, respectively. The flying control unit 25 calculates a predetermined range around the falling point as the falling area. For example, a circular area within a certain distance from the falling point may be set as the falling area. Then, the process proceeds to S105.

In S105, the flying control unit 25 transmits the falling information via the flying communication unit 24. Then, the flying control unit 25 ends the falling warning process shown in FIG. 3.

6. Process Executed by Vehicle-Mounted Device

The following will describe a risk avoiding process executed by the vehicle control unit 37 with reference to the flowchart of FIG. 4. The vehicle control unit 37 executes the risk avoiding process shown in FIG. 4 when an ignition switch of the vehicle is turned on.

In S201, the vehicle control unit 37 determines whether the falling information is received. When the vehicle control unit 37 determines that the falling information is received in S201, the process proceeds to S202.

In S202, the vehicle control unit 37 determines whether a transmission number of the received falling information has reached a maximum value. The transmission number of received falling information indicates the transmission number of received falling information to another vehicle-mounted devices 3 in chains, after the vehicle-mounted device 3 firstly receives the falling information from the flying device 2. The maximum value of the transmission number is set such that the falling possibility of the flying device 2 can be sufficiently notified to all of the vehicles that are possible to travel through the falling area. In S202, when the vehicle control unit 37 determines that the transmission number included in the received falling information is less than the maximum value, the process proceeds to S203.

In S203, the vehicle control unit 37 transmits the received falling information. Specifically, the vehicle control unit 37 increases the transmission number included in the received falling information by one, and then transmits the received falling information to another vehicle-mounted device. Then, the vehicle control unit 37 proceeds to S204.

When the vehicle control unit 37 determines that the transmission number included in the received falling information reaches the maximum value in S202, the vehicle control unit 37 proceeds to S204, without executing S203.

In S204, the vehicle control unit 37 determines a falling possibility of a falling object related to the falling information on the subject vehicle. Specifically, the vehicle control unit 37 estimates the position of the subject vehicle at the falling time. When the estimated position at the falling time is within the falling area, the vehicle control unit 37 determines the falling possibility of the falling object on the subject vehicle. When the vehicle control unit 37 determines the falling possibility of the falling object on the subject vehicle in S204, the process proceeds to S205.

In S205, the vehicle control unit 37 determines whether the traveling information is received. When the vehicle control unit 37 determines that the traveling information is received in S205, the process proceeds to S206.

In S206, the vehicle control unit 37 determines the possibility of collision with the vehicle from which the received traveling information is transmitted. In the present embodiment, when the traveling control corresponding to the received traveling information is executed on the transmission source vehicle of the traveling information and the subject vehicle continues to travel at the current speed, the vehicle control unit 37 determines whether there is a possibility of collision between the transmission source vehicle of the traveling information and the subject vehicle. Specifically, the vehicle control unit 37 calculates an estimated collision time based on the received traveling information, the speed information, and the distance measuring information. The estimated collision time is calculated by dividing a distance between the subject vehicle and the vehicle from which the traveling information is transmitted by the relative speed of the subject vehicle relative to the vehicle from which the traveling information is transmitted. The relative speed of the subject vehicle is estimated based on the received traveling information. When the estimated collision time is shorter than a predetermined time, the vehicle control unit 37 determines that the subject vehicle is possible to collide with the vehicle from which the traveling information is transmitted from. In the present embodiment, the vehicle control unit 37 determines the possibility of collision with the detected object, which is the transmission source vehicle of the traveling information, based on the distance measuring information. Alternatively, the vehicle control unit 37 may detect the object, which corresponds to the transmission source vehicle of traveling information, based on position information of transmission source vehicle included in the received traveling information, and determine the possibility of collision with the transmission source vehicle of traveling information. When the vehicle control unit 37 determines possibility of collision with the transmission source vehicle of the traveling information in S206, the process proceeds to S207.

In S207, the vehicle control unit 37 notifies the driver of the traveling control to be executed. In the present embodiment, the vehicle control unit 37 instructs the notification unit 35 to output an audio signal or display notifying images about the traveling control to be executed.

In S208, the vehicle control unit 37 performs traveling control for avoiding the falling area and for avoiding a collision with the transmission source vehicle from which the traveling information is transmitted. The traveling control for avoiding the falling area at least includes activation of automatic brake on the subject vehicle that is about to enter the falling area to prevent the subject vehicle from entering the falling area. In the present embodiment, the vehicle control unit 37 instructs the traveling control unit 36 to perform the traveling control such that the subject vehicle is prevented from entering the falling area, thereby avoiding a collision with the transmission source vehicle from which the traveling information is transmitted.

In S209, the vehicle control unit 37 transmits the traveling information. Specifically, the vehicle control unit 37 transmits the content of the traveling control to be executed as the traveling information.

In S210, the vehicle control unit 37 determines whether the falling object has fallen on the ground. In the present embodiment, the vehicle control unit 37 determines whether the falling object has fallen on the ground based on the received falling information. Specifically, the vehicle control unit 37 determines the falling object is fallen on the ground when the current time is later than the falling time. When the vehicle control unit 37 determines that the falling object is fallen on the ground in S210, the process proceeds to S215.

When the vehicle control unit 37 determines that the falling information is not received in S205, the process proceeds to S211. When vehicle control unit 37 determines that there is no collision possibility with the transmission source vehicle of the traveling information in S206, the process proceeds to S211.

In S211, the vehicle control unit 37 notifies the driver of performing the traveling control, similar to S207.

In S212, the vehicle control unit 37 performs the traveling control for avoiding the falling area. In the present embodiment, the vehicle control unit 37 instructs the traveling control unit 36 to perform the traveling control for avoiding the falling area.

In S213, the vehicle control unit 37 transmits the traveling information, similar to S209.

In S214, the vehicle control unit 37 determines whether the falling object has fallen on the ground, similar to S210. When the vehicle control unit 37 determines that the falling object is fallen on the ground in S214, the process proceeds to S215.

In S215, the vehicle control unit 37 ends the traveling control for avoiding the falling area, and ends the notification of performing the traveling control. In the present embodiment, when the vehicle control unit 37 determines there is no possibility of collision, the traveling control for avoiding the collision with the transmission source vehicle of the traveling information and notification of performing the traveling control are ended. Then, the vehicle control unit 37 returns to S201.

In S201, when the vehicle control unit 37 determines that no falling information is received in S201, the process proceeds to S216. In S204, when the vehicle control unit 37 determines that there is no possibility that the falling object is falling on the subject vehicle, the process proceeds to S216.

In S216, the vehicle control unit 37 determines whether the traveling information has been received, similar to S205. When the vehicle control unit 37 determines that the traveling information is not received in S216, the process returns to S201. When the vehicle control unit 37 determines that the traveling information is received in S216, the process proceeds to S217.

In S217, the vehicle control unit 37 determines the possibility of collision with the transmission source vehicle of the traveling information, similar to S206. When the vehicle control unit 37 determines there is no possibility of collision with the transmission source vehicle of the traveling information in S217, the process returns to S201. When the vehicle control unit 37 determines there is a possibility of collision with the transmission source vehicle of the traveling information in S217, the process proceeds to S218.

In S218, the vehicle control unit 37 notifies the driver of performing the traveling control, similar to S207 and S211.

In S219, the vehicle control unit 37 performs vehicle control for avoiding a collision with the transmission source vehicle of the traveling information. In the present embodiment, the vehicle control unit 37 instructs the traveling control unit 36 to avoid a collision with the transmission source vehicle of the traveling information.

In S220, the vehicle control unit 37 transmits the traveling information, similar to S209 and S213. Then, the vehicle control unit 37 returns to S201.

7. Effects

The above-described embodiment can provide the following effects.

(7a) In the fall damage reducing system 1 of the present embodiment, in response to determination of falling possibility, the flying device 2 transmits the falling information, which includes information indicating the falling area, via wireless communication under vehicle to vehicle communication standard. The vehicle-mounted device 3 performs a process for avoiding the falling area when the falling information is received. With such configuration, the damage on the vehicle caused by falling of the flying device 2 on the vehicle can be effectively reduced. In a configuration where each vehicle is equipped with a special purpose receiver for directly receiving information from the flying device, similar effect as that of the above-described embodiment can be provided by directly notifying the falling possibility of flying device to the vehicle. However, since frequent falling of the flying device is not assumed, wide use of the above-mentioned receiver is difficult to be spread, and a number of the vehicles that can perform the process for avoiding falling of the flying device is limited. In the configuration of the above-described embodiment of the present disclosure, it is possible to directly notify the falling possibility of the flying device to the vehicle, which is equipped with the vehicle-mounted device 3 capable of performing vehicle to vehicle communication. Thus, comparing to the above-described configuration in which the falling information from the flying device is directly received by the special purpose receiver of the vehicle, the fall damage of the flying device on the vehicle can be further effectively reduced.

(7b) In the fall damage reducing system 1 of the present embodiment, when the falling information is received, the vehicle-mounted device 3 further transmits the received falling information to another vehicle-mounted device. With such configuration, the vehicle with the vehicle-mounted device 3 out of the communication area of the flying device 2 is able to receive the falling information. Thus, the fall damage caused by the flying device 2 on the vehicle can be reduced by avoiding the collision in advance.

(7c) In the fall damage reducing system 1 of the present embodiment, when the number of transmission of the falling information reaches the preset maximum value, the vehicle-mounted device 3 stops further transmission of the falling information. With this configuration, a transmission chain of unnecessary falling information can be reduced, such as the transmission chain of the falling information to the vehicles that are not possible to travel through the falling area at the falling time.

(7d) In the fall damage reducing system 1 of the present embodiment, when the falling object is determine as fallen on the ground, the vehicle-mounted device 3 ends the traveling control for avoiding the falling area and the notification to the driver about the traveling control. With such configuration, the execution of traveling control for avoiding the falling area can be reduced when there is no damage possibility caused by the falling of the flying device 2.

(7e) In the fall damage reducing system 1 of the present embodiment, the vehicle-mounted device 3 performs the traveling control for avoiding the falling area and transmits the traveling information related to the performed traveling control. With such configuration, the secondary damage caused by a collision between the subject vehicle, which preforms the traveling control for avoiding the falling area, and a periphery vehicle, which travels around the subject vehicle, can be reduced.

(7f) In the fall damage reducing system 1 of the present embodiment, the vehicle-mounted device 3 performs the traveling control for avoiding a collision with the transmission source vehicle of the received traveling information, and transmits own traveling information related to the performed traveling control to another vehicle. With such configuration, the secondary damage caused by a collision between the vehicle, which preforms the traveling control for avoiding the collision with the transmission source vehicle of the traveling information, and a periphery vehicle, which travels around the vehicle preforming the traveling control, can be reduced.

(7g) In the fall damage reducing system 1 of the present embodiment, the flying device 2 transmits the falling information even when the falling possibility of the package carried by the flying device 2 is determined. With such configuration, the fall damage on the vehicle by the falling package carried by the flying device 2 can be reduced.

(7h) In the fall damage reducing system 1 of the present embodiment, the flying device 2 transmits the falling information even when the falling possibility of a part of the flying device 2 is determined. With such configuration, the fall damage on the vehicle by the falling part of the flying device 2 can be reduced.

In the present embodiment, the process executed in S101 corresponds to a device falling determination unit, the process executed in S102 corresponds to a package falling determination unit, the process executed in S103 corresponds to a part falling determination unit, and the process executed in S104, S105 corresponds to a flying notification unit. The process executed in S207, S208, S210, S211, S212, S214, S215, S218, and S219 corresponds to a processing unit, the process executed in S202 and S203 corresponds to a falling notification unit, and the process executed in S209, S213, S220 corresponds to a traveling notification unit. The process executed in S207, S208, S211, and S212 corresponds to the falling avoidance process, the process executed in S209, S213, and S220 corresponds to the notification process, and the process executed in S207, S208, S218, and S219 corresponds to a collision avoidance process. The process executed in S101 also corresponds to a falling determination unit.

8. Other Embodiments

The present disclosure is not limited to the embodiment described above and can have different modifications.

(8a) In the above embodiment, as an example of the traveling control for avoiding the falling area, the control to avoid entering the falling area by activating the automatic brake is exemplified. The traveling control for avoiding the falling area is not limited to this configuration. For example, the vehicle may be controlled to travel through the falling area by accelerating the traveling speed before the falling of an object on the ground, or the vehicle may be controlled to move to a position distant from the falling area by performing a steering control.

(8b) In the above embodiment, as the process for avoiding the falling area, traveling control for avoiding the entrance to the falling area and notification to the driver are described as an example. As another example, only the traveling control to avoid entering into the falling area or only the notification to the driver may be performed. When the traveling control is not performed, the content of the notification to the driver may be a warning about avoiding of entrance into the falling area. Similarly, regarding the process for avoiding collision with the transmission source vehicle of the received falling information, only the traveling control or only the notification to the driver may be performed as the process for avoiding the collision.

(8c) In the above embodiment, as the information representing the estimated falling position of the flying device 2, the information representing a falling area set within a certain range is described as an example. As another example, the information representing the falling position may be information representing a location other than the certain range.

(8d) In the above embodiment, the falling of the flying device 2 on the ground is determined based on the falling time of the flying device 2 on the ground. As another example, a shock sensor may be equipped to the flying device 2 to detect a shock with the fall, such that the flying device is able to determine whether the flying device 2 has fallen onto the ground by itself. When the flying device 2 determines the falling of own device on the ground, the flying device may transmit fallen notification to the vehicle, similar to the transmission of falling information. When the vehicle-mounted device 3 receives the fallen notification from the flying device, ends the process for avoiding the falling area. Similar to the above embodiment, when the fallen notification is received, the vehicle-mounted device 3 may transmit the received fallen notification via vehicle to vehicle information. With such configuration, the vehicle is informed of a more precise falling time of the flying device 2, such that the vehicle-mounted device 3 can end the process for avoiding the falling area at a more appropriate timing.

(8e) In the above embodiment, the falling information is transmitted to other vehicles via vehicle to vehicle communication. As another example, when the communication area of the flying device 2 is much more broader than the falling area, the falling information may not be transmitted to other vehicles.

(8f) In the above embodiment, when the number of transmission of the falling information reaches the maximum value, the falling information is not transmitted further. The condition for transmitting of falling information is not limited to this configuration. For example, the condition for transmitting of falling information may be set to a predetermined time period from which the falling information starts to be transmitted.

(8g) In the above embodiment, the wind speed sensor 216 detects the wind strength and wind direction around the flying device 2 as an example. As another example, the strength and direction of the wind around the flying device 2 may be estimated based on an environment temperature and an environment pressure. For example, a thermometer or barometer may be provided to the flying device 2 to estimate a relationship between the detected changes in temperature and pressure and the wind, and thus the strength and direction of the wind around the flying device 2 can be estimated.

(8h) The functions of one component in the above embodiment may be implemented by multiple components, or the functions of multiple components may be integrated into a single component. A part of the components described in the above embodiments may be omitted. At least a part of the components described in one embodiment may be added to or replaced with the corresponding part described in another embodiment.

What is claimed is:

1. A fall damage reducing system comprising:
   a flying device; and
   a vehicle-mounted device,
   wherein
   the flying device includes:
     a first wireless communication-unit circuit configured to perform a wireless communication using a vehicle to vehicle communication standard; and
     at least one first processing circuit configured to determine a falling possibility of the flying device and to transmit, via the first wireless communication circuit, falling information including information indicating an estimated falling position of the flying device in response to determining the falling possibility of the flying device,
   the vehicle-mounted device includes:
     a second wireless communication circuit configured to perform wireless communication using the vehicle to vehicle communication standard; and
     at least one second processing circuit configured to execute a falling avoidance process on a subject vehicle to avoid the estimated falling position when the second wireless communication circuit receives the falling information, to execute a vehicle control on the subject vehicle to avoid the estimated falling position as the falling avoidance process, and to execute a notification process by transmitting, via the second wireless communication circuit, traveling information indicating the vehicle control executed on the subject vehicle;
   when the second wireless communication circuit receives traveling information from a different vehicle, the at least one second processing circuit executes a collision avoidance process to avoid a collision with the different vehicle from which the traveling information is transmitted;
   when the second wireless communication circuit receives the falling information, the at least one second processing circuit repeatedly transmits, via the second wireless communication circuit, the received falling information toward a periphery of the subject vehicle at a predetermined cycle; and
   in response to a predetermined time period being elapsed after the falling information is firstly transmitted, the at least one second processing circuit cancels transmission of the falling information.

2. The fall damage reducing system according to claim 1, wherein the at least one second processing circuit cancels a transmission of the received falling information toward the periphery of the subject vehicle when a preliminarily set condition, which limits a transmission number of the falling information, is satisfied.

3. The fall damage reducing system according to claim 1, wherein
   the at least one second processing circuit finishes the falling avoidance process when an object related to the falling information is determined as fallen.

4. The fall damage reducing system according to claim 1, wherein,
   when the second wireless communication circuit receives the traveling information from the different vehicle, the at least one second processing circuit executes, as the collision avoidance process, a vehicle control on the subject vehicle to avoid the collision with the different vehicle from which the traveling information is transmitted, and
   when the at least one second processing circuit executes the vehicle control on the subject vehicle as the collision avoidance process, the at least one second processing circuit executes the notification process by transmitting traveling information indicating the vehicle control executed on the subject vehicle.

5. The fall damage reducing system according to claim 1, wherein the at least one first processing circuit is further configured to:
   determine a falling possibility of a package carried by the flying device, and
   transmit the falling information via the first wireless communication circuit when the falling possibility of the package is determined.

6. The fall damage reducing system according to claim 1, wherein at least one first processing circuit is further configured to:
   determine a falling possibility of a part of the flying device, and
   transmit the falling information via the first wireless communication circuit when the falling possibility of the part of the flying device is determined.

7. A vehicle-mounted device included in a fall damage reducing system, the fall damage reducing system further including a flying device that transmits falling information indicating an estimated falling position of the flying device under a vehicle to vehicle communication standard in response to a falling possibility of the flying device being determined, the vehicle-mounted device comprising:
- a wireless communication circuit configured to perform a wireless communication under the vehicle to vehicle communication standard; and
- at least one processing circuit configured to execute a falling avoidance process on a subject vehicle to avoid the estimated falling position when the wireless communication circuit receives the falling information, the at least one processing circuit being further configured to execute a vehicle control on the subject vehicle to avoid the estimated falling position as the falling avoidance process;

wherein:
the at least one processing circuit is further configured to execute a notification process by transmitting, via the wireless communication circuit, traveling information indicating the vehicle control executed on the subject vehicle,
when the wireless communication circuit receives traveling information from a different vehicle, the at least one processing circuit executes a collision avoidance process to avoid a collision with the different vehicle from which the traveling information is transmitted,
when the wireless communication circuit receives the falling information, the at least one processing circuit repeatedly transmits, via the wireless communication circuit, the received falling information toward a periphery of the subject vehicle at a predetermined cycle; and
in response to a predetermined time period being elapsed after the falling information is firstly transmitted, the at least one processing circuit cancels transmission of the falling information.

8. A fall damage reducing system comprising:
a flying device; and
a vehicle-mounted device,
wherein
the flying device includes:
- a first computer-readable non-transitory storage medium; and
- a first microcomputer, by executing a first program stored in the first computer-readable non-transitory storage, configured to:
  perform a wireless communication under a vehicle to vehicle communication standard;
  determine a falling possibility of the flying device; and
  transmit falling information including information indicating an estimated falling position of the flying device in response to a determination of the falling possibility of the flying device, the vehicle-mounted device includes:
- a second computer-readable non-transitory storage medium; and
- a second microcomputer, by executing a second program stored in the computer-readable non-transitory storage, configured to:
  perform a wireless communication under the vehicle to vehicle communication standard;
  execute a falling avoidance process on a subject vehicle to avoid the estimated falling position in response to the falling information being received;
  execute a vehicle control on the subject vehicle to avoid the estimated falling position as the falling avoidance process; and
  execute a notification process by transmitting traveling information indicating the vehicle control executed on the subject vehicle, and when the vehicle-mounted device of the subject vehicle receives traveling information from a different vehicle, the vehicle-mounted device of the subject vehicle executes a collision avoidance process to avoid a collision with the different vehicle from which the traveling information is transmitted,
when the vehicle-mounted receives the falling information, the second microcomputer is configured to repeatedly transmit the received falling information toward a periphery of the subject vehicle at a predetermined cycle; and
in response to a predetermined time period being elapsed after the falling information is firstly transmitted, the second microcomputer cancels transmission of the falling information.

\* \* \* \* \*